Figures 1, 2:
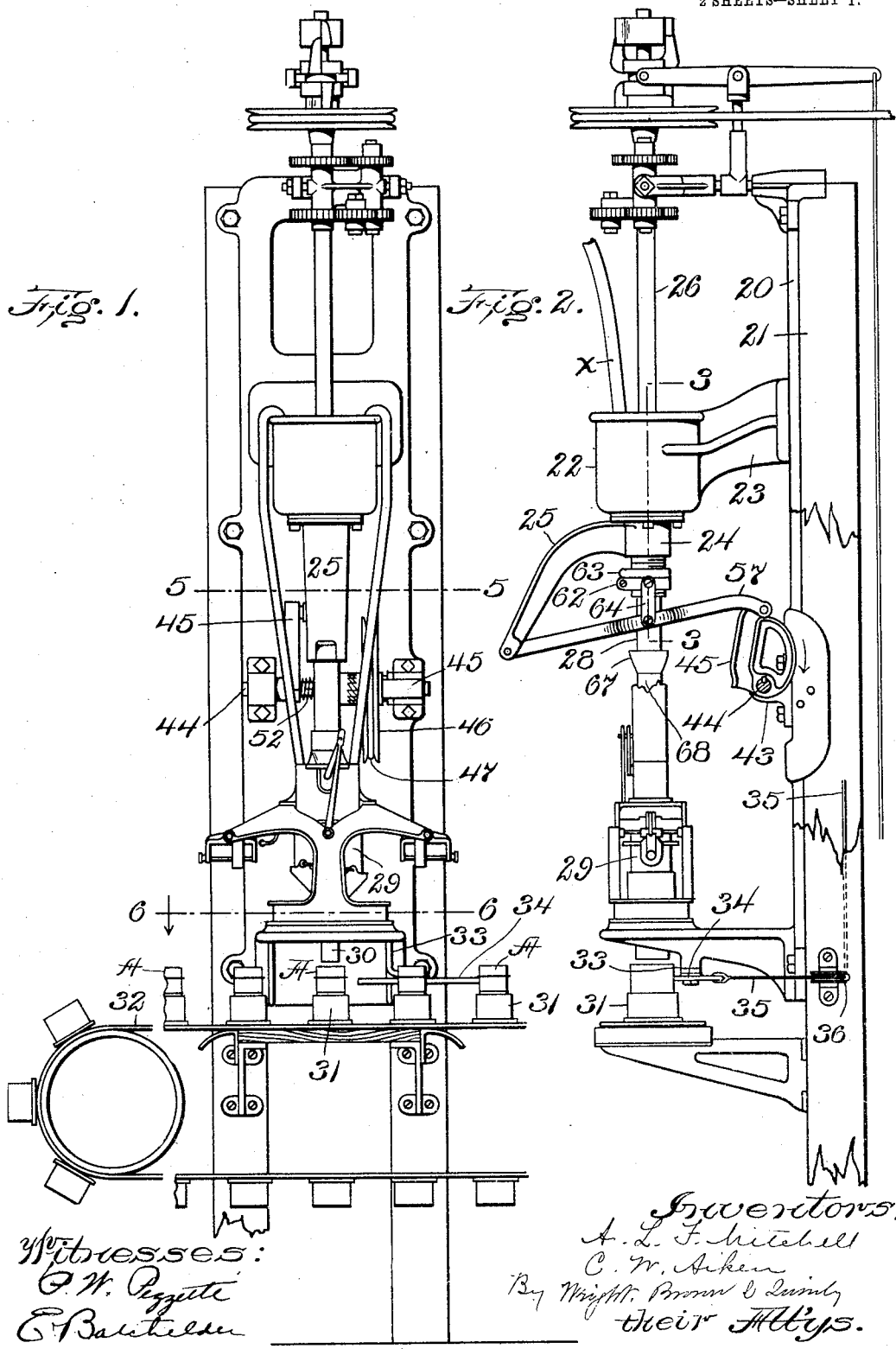

No. 784,007. PATENTED FEB. 28, 1905.
A. L. F. MITCHELL & C. W. AIKEN.
FEEDING MECHANISM FOR WEIGHING MACHINES.
APPLICATION FILED APR. 14, 1904.

2 SHEETS—SHEET 1.

Witnesses:
Inventors:
A. L. F. Mitchell
C. W. Aiken
By Wright, Brown & Quinby
their Attys.

No. 784,007. PATENTED FEB. 28, 1905.
A. L. F. MITCHELL & C. W. AIKEN.
FEEDING MECHANISM FOR WEIGHING MACHINES.
APPLICATION FILED APR. 14, 1904.
2 SHEETS—SHEET 2.
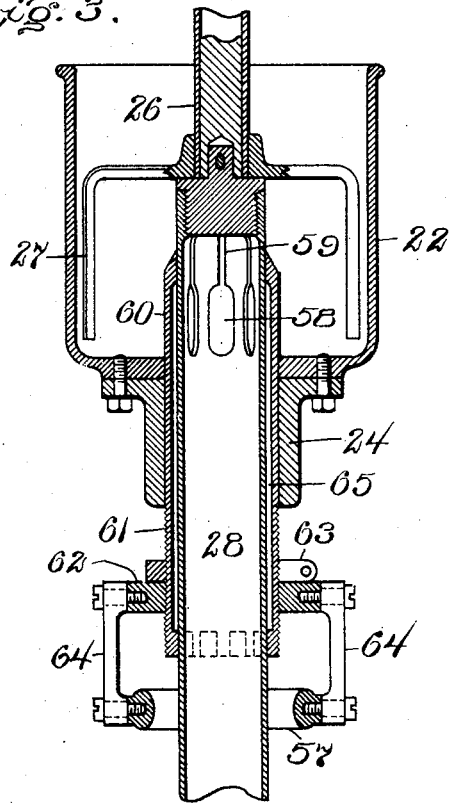
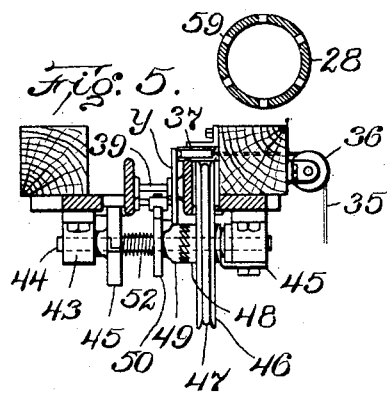
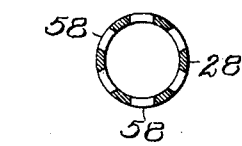
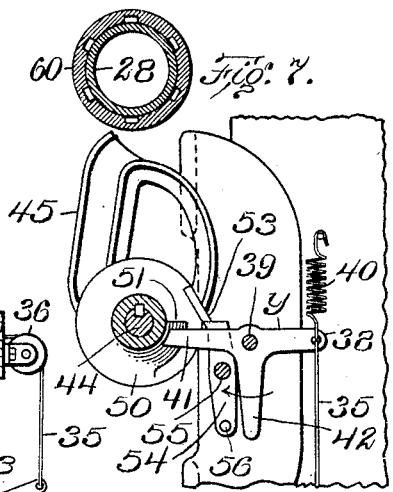
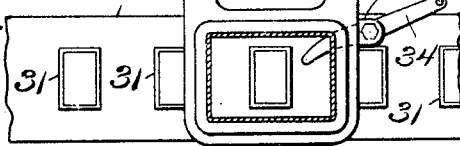
Witnesses:
Inventors:
A. L. F. Mitchell
C. W. Aiken
By Wright, Brown & Quinby
their Attys.

No. 784,007.

Patented February 28, 1905.

UNITED STATES PATENT OFFICE.

ALBION L. F. MITCHELL, OF BOSTON, MASSACHUSETTS, AND CHARLES W. AIKEN, OF EAST ORANGE, NEW JERSEY.

FEEDING MECHANISM FOR WEIGHING-MACHINES.

SPECIFICATION forming part of Letters Patent No. 784,007, dated February 28, 1905.

Application filed April 14, 1904. Serial No. 203,146.

*To all whom it may concern:*

Be it known that we, ALBION L. F. MITCHELL, of Boston, in the county of Suffolk and State of Massachusetts, and CHARLES W. AIKEN, of East Orange, in the county of Essex and State of New Jersey, have invented certain new and useful Improvements in Feeding Mechanism for Weighing-Machines, of which the following is a specification.

This invention relates to means for controlling the feed of powdery material to weighing-machines, particularly of that type which will deliver the material to the boxes or packages in which said material is to be furnished to the trade.

The invention has for its object chiefly to provide improved mechanism for feeding powdery material, such as soap powder, which is more or less difficult to control in its delivery to the weighing-machine and therefrom to the boxes in which said material is to be packed. In Letters Patent of the United States No. 735,281, granted to us August 5, 1903, a hopper is shown, into which the soap powder or other powdery material is delivered and from which the material passes through slits in a delivery-tube, stirrers being employed to insure the proper delivery of the material through the slits of said tube.

In some respects our present invention resembles that which is shown and claimed in the said patent. Our present invention, however, provides for the employment of means for automatically varying the stream of powdery material, so that the said material will be at times fed in large quantities, so as to result in a more rapid operation of the apparatus as a whole, the feeding mechanism at other times delivering a small stream. In other words, while there is a continuous stream of powdery material being fed it is varied in quantity, the object of feeding a small quantity at the periods of feed between the delivery of large quantities through the tube being to provide for the accurate operation of the weighing mechanism. In weighing-machines of the type commonly employed for weighing such material it is impossible to obtain accurate results of the weighing if the material is fed very rapidly all the time.

A further object of our invention is to provide a feeding mechanism which will practically cease operation if no box or other receptacle is present to receive the material weighed.

To these ends our invention consists in the construction and combination of parts, substantially as hereinafter described and claimed.

Of the accompanying drawings, forming a part of this specification, Figure 1 represents a front elevation of a machine embodying our present invention, the same including also a somewhat conventional representation of a well-known form of weighing-machine and of a conveyer for bringing the boxes into position to receive the material from the weighing-machine. Fig. 2 represents a side elevation of the same. Fig. 3 represents an enlarged sectional detail on the line 3 3 of Fig. 2. Fig. 4 is a view similar to Fig. 3, but showing the parts in a different position. Fig. 5 represents a section on line 5 5 of Fig. 1. Fig. 6 represents a section on line 6 6 of Fig. 1. Fig. 7 represents a detail vertical section taken through the clutch-shaft and showing also the cam carried by said shaft. Figs. 8, 9, and 10 are detail sections on line 8 8, 9 9, and 10 10, respectively, of Fig. 4.

The same reference characters indicate the same or similar parts throughout the several views.

A suitable framework for the entire apparatus is indicated at 20, said framework being secured to supporting uprights or timbers 21. The hopper 22 for receiving material from a suitable chute or spout *x* is supported by a bracket 23, projecting from the framework 20. A sleeve 24 is secured to the bottom of the hopper, from which sleeve a bracket-arm 25 extends, as clearly shown in Fig. 2.

A stirrer-shaft 26, having blades 27 in the hopper 22, is rotated by suitable mechanism, (represented somewhat conventionally in Figs. 1 and 2,) and which mechanism it is not necessary to specifically describe herein. The outlet or delivery tube 28 is suitably supported with its upper end located within the hopper, the lower end of said delivery-tube leading to the weighing-machine 29. Said weighing-machine is preferably of that type which employs two alternately-moving buckets into which the material is fed. Each of the buckets when filled with a predetermined quantity of material will discharge said material through a spout 30 into packing-boxes A, which are placed in holders 31, mounted upon an endless belt or carrier 32. Since the weighing-machine proper and the carrier for the boxes form no part of our present invention, they do not need to be described or shown herein in detail.

The carrier may be driven either continuously or intermittently by any well-known or preferred means.

The framework which supports the weighing-machine 29 is provided with a lug 33, to which a lever 34 is pivoted. (See Figs. 1, 2, and 6.) The inner end of the lever 34 projects into the path of movement of the boxes A. From the other or outer end of the lever 34 a flexible connection 35, such as a rope or chain, leads over idler-pulleys 36 and 37 to the arm 38 of a lever $y$, (see Fig. 7,) said lever being pivoted at 39 and having a spring 40, by means of which it will be normally held in the position shown in Fig. 7. At the same time the spring 40, which has its upper end connected with a suitable part of the frame, serves, through the connection 35, to hold the lever 34 normally in the position shown in Fig. 6. The lever $y$ has two other arms, 41 and 42, the purposes of which will be hereinafter described. Mounted in suitable bearings 43, attached to the frame of the machine, is a shaft 44, to which is secured a cam 45. A pulley 46, loosely mounted on the shaft 44, is constantly driven by a belt 47, connected to a suitable driving-pulley. (Not shown.) The hub of the pulley 46 is formed with clutch-teeth 48, adapted to be engaged by similar teeth formed upon a clutch member 49, splined on the shaft 44. Formed with or connected to the clutch member 49 is a disk 50, on one side of which is a cam projection 51. (See Fig. 7.) A spring 52 (see Fig. 5) is coiled about the shaft 44 between the cam 45 and the disk 50, said spring therefore having a tendency to force the clutch member 49 toward the right in Fig. 5, so that the teeth of said clutch member will engage with the teeth 48 of the pulley 46; but as long as the parts are in the relative positions shown in Fig. 7 the arm 41 of the lever $y$ is laterally engaged by the cam projection 51, and the clutch member 49 is therefore held in the position shown in Fig. 5, so that there will be no interengagement of clutch-teeth. In order that the parts may normally stand in the positions shown in Fig. 7, the disk 50 is formed with a tooth or projection 53, which will rest upon the upper end of the stop 54, pivoted at 55, the lower end of said pivoted stop having a lateral pin 56. It will now be understood that every box A which engages the free end of the lever 34 will cause a pull upon the connection 35, so as to swing the lever $y$ in the direction of the arrow in Fig. 7. This motion of the lever $y$ causes the arm 42 to engage the pin 56 and swing the pivoted stop 54, so as to carry its upper end out of the path of the tooth or projection 53 of the disk 50. At the same time the arm 41 of the lever $y$ leaves the cam 51 of the disk 50 and permits the spring 52 to cause the engagement of the clutch. Since the clutch member 49 is, as above stated, splined upon the shaft 44, the rotating pulley 46 and the clutch-teeth carried by its hub cause the shaft 44 to revolve, said shaft carrying the cam 45 with it. Said shaft and cam have but a single rotation, however, because before the completion of one rotation the box A has passed the lever 34, so as to enable the spring 40 to return the lever $y$ to the position shown in Fig. 7, thus permitting the pivoted stop 54 to return to normal position, so that the upper end thereof will be in the path of the projection 53 of the disk 50. Then the cam 51 engaging the arm 41 of the lever $y$ results in the separation of the clutch members.

A lever 57, pivoted to the end of the bracket-arm 25, is engaged by the cam 45 to control the feed of material, as will now be described.

Referring particularly to Figs. 3 and 4, it will be seen that the outlet or delivery tube 28 is provided with large feed openings or ports 58, from which slits 59 extend upward. Said slits 59 form small ports which in this instance are continuations of the relatively larger ports 58.

Surrounding the tube 28 and fitted to slide vertically through the opening in the hopper 22 and sleeve 24 is the tubular controlling-valve 60, having its lower portion threaded as at 61. A collar 62 is internally threaded to fit the threaded portion of the tubular valve 60, and a set-collar or jam-nut 63 is employed to secure the collar 62 in its adjusted position relatively to said valve. Links 64 connect the collar 62 with the lever 57, so that the movements of the lever 57 caused by the cam 45 will raise and lower the tubular controlling-valve 60.

If the valve 60 were fitted more or less closely to the tube 28, powdery material, such as soap powder, would find entrance between the two and cause such a binding as to prevent operation of the valve. The controlling-valve is therefore, excepting at its upper and lower ends, of a greater diameter internally than the external diameter of the tube 28, so as to form a space 65 between the two tubes. The lower portion of the valve-tube which bears upon the surface of the tube 28 is formed with escape-ports 66, through which any powdery material that finds its way between the two tubes may escape and drop into the funnel-shaped upper end 67 of the usual sliding section or tube 68, which is employed to conduct the material to the weighing-machine.

The cam 45 and the tubular valve are normally in the positions shown, respectively, in Figs. 2 and 3. Each box A actuates the lever 34 to cause the valve to open the large ports 58, so that by the time the box is in position under the spout 30 from the weighing-machine the material has been first rapidly fed to quickly supply the weighing-machine and then slowly fed to accurately weigh the material and then permit the deposit of the proper quantity into such box. If a box is omitted from the carrier, the cam 45 will remain in the position shown in Fig. 2, because there is nothing to actuate the lever 34. With the cam 45 stationary the controlling-valve remains in the position shown in Fig. 3, and there will be only a small quantity of material supplied from the hopper 22.

It will be noticed that the shape of the cam 45 is such that when it is given its rotation it will be in the direction of the arrow shown adjacent to the shaft 44 in Fig. 2. The movement of the lever 57 downward will be rapid, so as to quickly open the large ports 58, after which opening and the rapid supply of nearly enough material into the weighing-machine to fill a box the upward movement of the lever 57 will be comparatively slow, so as to gradually diminish the stream to a very small quantity.

It will be seen that we have provided an apparatus comprising a weighing-machine and means for continuously supplying a stream of material which is automatically variable, so as to secure a rapid supply of the chief quantity of material necessary to fill a box and a slower supply of enough more to secure an accurate balancing. We therefore secure a great saving of time in the weighing and filling of a quantity of boxes.

As above stated, the weighing-machine itself is preferably of that type which employs two alternately-moving buckets, into which the material is fed. It will therefore be obvious that when the feeding mechanism illustrated is used in connection with a weighing-machine of said type the material will be alternately deflected from one bucket to the other, and the stream will be automatically reduced just prior to the completion of a load.

As has also been stated, the pulley 46, which is loosely mounted on the shaft 44, is constantly driven. Said shaft, therefore, or the means for driving it may be referred to as the "motor," which through the medium of the cam 45 and the mechanism actuated thereby will at certain times shift the valve which varies the stream of material being fed. The motor for shifting said valve is therefore independent of the weight of the material in the bucket of the weighing-machine. The control or variation of the stream is therefore more perfectly effected than could be the case if such variation depended upon either movements of the bucket of the weighing-machine or upon movements of the stream of material.

We claim—

1. An apparatus of the character described, comprising a weighing-machine having a plurality of alternately-operating buckets, means for feeding a constant but variable stream of material alternately to the buckets, and means independent of the weighing-machine for automatically reducing the stream just before the completion of a load.

2. An apparatus of the character specified, comprising a weighing-machine, means for supplying a constant but variable stream of material thereto, and means independent of the weighing-machine for automatically reducing said stream.

3. An apparatus of the character specified, comprising a weighing-machine, means for continuously supplying a stream of material thereto, a carrier for boxes in which the material is to be placed after weighing, and means whereby the variation of the stream will be controlled by a box on said carrier.

4. In an apparatus of the character specified, the combination with a hopper, of a feeding or delivery tube leading therefrom and having large ports, and relatively small ports above the large ports, a tubular valve movable lengthwise of the said delivery-tube, and means for shifting the tubular valve.

5. In an apparatus of the character specified, the combination with a hopper, of a delivery-tube leading therefrom and having ports, a tubular controlling-valve movable longitudinally of the delivery-tube and having a space formed between it and said delivery-tube, escape-ports being formed at the lower end of said space, and means for sliding said tubular valve.

6. In an apparatus of the character specified, the combination with a hopper, of a feeding or delivery tube leading therefrom and having large ports, and relatively small ports above the large ports, a tubular valve movable lengthwise of the said delivery-tube, a lever connected with said tubular valve, and means for automatically operating said lever.

7. In an apparatus of the character specified, the combination with a hopper, of a feeding or delivery tube leading therefrom and having large ports, and relatively small ports above the large ports, a tubular valve movable lengthwise of the said delivery-tube, a lever connected with said tubular valve, and means for automatically operating said lever, means being provided for adjusting the connection between said lever and valve.

8. In an apparatus of the character specified, the combination with a hopper, of a feeding or delivery tube leading therefrom and having large ports, and relatively small ports above the large ports, a tubular valve movable lengthwise of the said delivery-tube, a lever connected with said tubular valve, a cam for actuating said lever, and means for intermittently operating said cam.

9. An apparatus of the character specified, comprising a weighing-machine, a hopper, an outlet or delivery tube from said hopper for supplying material to the weighing-machine, said tube having openings of varying sizes, a tubular valve movable longitudinally of the delivery-tube, a lever having connections with said tubular valve to actuate the latter, a cam for actuating the lever, said cam having a shape to impart a quick movement to the lever in one direction and a comparatively slow return movement, and means for intermittently operating said cam.

10. In an apparatus of the character specified, the combination with a hopper, of the delivery-tube 28 having large ports 58 and slits connecting therewith, the tubular valve 60 having an externally-threaded lower portion, the collar 62 and jam-nut 63 fitted to said threaded portion of the valve, a lever, links connecting said lever and collar, and means for actuating the lever.

11. In an apparatus of the character specified, the combination with the hopper, of the delivery-tube opening therefrom and having openings in its walls, a tubular valve inclosing said delivery-tube and separated therefrom by a space, escape-ports being formed at the lower end of the tubular valve to permit of the escape of material in said space, and a tube having a funnel-shaped upper end to receive the material escaping from said space.

In testimony whereof we have affixed our signatures in presence of two witnesses.

ALBION L. F. MITCHELL.
CHARLES W. AIKEN.

Witnesses to A. L. F. M.:
   C. F. BROWN,
   E. BATCHELDER.
Witnesses to C. W. A.:
   HOWARD R. BARTON,
   LEE VAN WERT.